United States Patent
Gregor et al.

(10) Patent No.: US 10,783,299 B1
(45) Date of Patent: Sep. 22, 2020

(54) SIMULATION EVENT REDUCTION AND POWER CONTROL DURING MBIST THROUGH CLOCK TREE MANAGEMENT

(71) Applicant: Cadence Design Systems, Inc., San Jose, CA (US)

(72) Inventors: Steven Lee Gregor, Oswego, NY (US); Puneet Arora, Noida (IN); Norman Robert Card, Vestal, NY (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 183 days.

(21) Appl. No.: 15/936,999

(22) Filed: Mar. 27, 2018

(51) Int. Cl.
*G06F 30/00* (2020.01)
*G06F 30/3312* (2020.01)
*G06F 111/20* (2020.01)
*G06F 119/12* (2020.01)

(52) U.S. Cl.
CPC ...... *G06F 30/3312* (2020.01); *G06F 2111/20* (2020.01); *G06F 2119/12* (2020.01)

(58) Field of Classification Search
CPC .................................................. G06F 17/5031
USPC ........................................................ 716/108
See application file for complete search history.

(56) References Cited

U.S. PATENT DOCUMENTS

| | | | | |
|---|---|---|---|---|
| 6,061,811 A * | 5/2000 | Bondi | .................. | G06F 11/2236 714/30 |
| 6,769,081 B1 * | 7/2004 | Parulkar | ................ | G11C 29/16 714/733 |
| 7,925,465 B2 * | 4/2011 | Lin | .................. | G01R 31/31857 702/124 |
| 10,169,177 B1 * | 1/2019 | Shivaray | ............. | G06F 11/2284 |
| 2003/0065997 A1 * | 4/2003 | Yamazaki | .............. | G11C 29/36 714/718 |
| 2004/0073841 A1 * | 4/2004 | Toros | ................ | G01R 31/31705 714/30 |
| 2008/0250289 A1 * | 10/2008 | Gloekler | .......... | G01R 31/31716 714/733 |
| 2009/0158101 A1 * | 6/2009 | Abu-Rahma | ............ | G11C 8/08 714/701 |
| 2009/0228751 A1 * | 9/2009 | Gloekler | .......... | G01R 31/31853 714/728 |
| 2010/0050031 A1 * | 2/2010 | Gass | ................ | G01R 31/31725 714/733 |
| 2010/0174933 A1 * | 7/2010 | Lu | ......................... | G06F 1/3203 713/324 |

(Continued)

*Primary Examiner* — Suchin Parihar
(74) *Attorney, Agent, or Firm* — Tarolli, Sundheim, Covell & Tummino LLP

(57) ABSTRACT

An exemplary system, method, and computer-accessible medium may be provided, which may include, for example, receiving a design a memory including a plurality MBIST logic paths and a plurality of non-MBIST logic paths, determining particular non-MBIST logic path(s) of the non-MBIST logic paths to deactivate, and deactivating only the particular non-MBIST logic path(s). The particular non-MBIST logic path(s) may be deactivated using a clock signal. A simulation on the memory may be performed while the particular non-MBIST logic path(s) may be deactivated. The particular non-MBIST logic path(s) may be reactivated after the simulation has been performed. The deactivating the particular non-MBIST logic path(s) may include forcing all flip flops in the particular non-MBIST logic path(s) to a known state.

20 Claims, 6 Drawing Sheets

(56) References Cited

U.S. PATENT DOCUMENTS

| | | | |
|---|---|---|---|
| 2010/0287400 A1* | 11/2010 | Chou | G06F 9/3871 |
| | | | 713/400 |
| 2011/0137604 A1* | 6/2011 | Dasnurkar | H03M 1/109 |
| | | | 702/117 |
| 2012/0198294 A1* | 8/2012 | Nadeau-Dostie | G11C 29/1201 |
| | | | 714/719 |
| 2012/0272110 A1* | 10/2012 | Rajski | G01R 31/31721 |
| | | | 714/726 |

* cited by examiner

SIMULATION EVENT REDUCTION AND POWER CONTROL DURING MBIST THROUGH CLOCK TREE MANAGEMENT

TECHNICAL FIELD

The present disclosure relates generally to memory built-in self-test ("MBIST") patterns, and more specifically, to an exemplary simulation event reduction and power control during MBIST through clock tree management.

BACKGROUND

The verification of MBIST patterns and hardware generally requires a simulation of the test patterns. Simulation time, often of the order of millions of cycles, may be the largest contributing factor (e.g., in terms of time) of the process, which may include MBIST hardware validation through pattern verification. This may take days, or even up to weeks, depending on the design size and number of memories in the design. When simulating MBIST patterns using an event-driven simulator, many of the events may be on paths in the logic that may not be required for the MBIST logic and associated memories under test. However, these events are generally evaluated by the simulator and may take a significant amount of time, even though they may not be required for verification of the MBIST hardware. While executing MBIST on the actual hardware, these unrequired events consume power, which may be undesirable.

Thus, it may be beneficial to provide an exemplary system, method, and computer-accessible medium for simulation event reduction and power control during MBIST through clock tree management, which may overcome at least some of the deficiencies presented herein above.

SUMMARY

An exemplary system, method, and computer-accessible medium may be provided, which may include, for example, receiving a memory design including a plurality of MBIST logic paths and a plurality of non-MBIST logic paths, determining particular non-MBIST logic path(s) of the non-MBIST logic paths to deactivate, and deactivating only the particular non-MBIST logic path(s). The particular non-MBIST logic path(s) may be deactivated using a clock signal. A simulation on the memories within the design may be performed while the particular non-MBIST logic path(s) may be deactivated. The particular non-MBIST logic path(s) may be reactivated after the simulation has been performed. The deactivating of the particular non-MBIST logic path(s) may include forcing all flip flops in the particular non-MBIST logic path(s) to a known state.

In some exemplary embodiments of the present disclosure, the flip flops are forced to the known state using a clock signal, which may be a system clock signal. A simulation may be performed on the memory while the particular non-MBIST logic path(s) may be deactivated. The deactivating of the particular non-MBIST logic path(s) may include forcing the particular non-MBIST logic path(s) to a known state. The particular non-MBIST logic path(s) may be forced to the known state using a force statement(s).

The particular non-MBIST logic path(s) to deactivate may be determined by identifying a plurality of cones in the particular non-MBIST logic paths. The particular non-MBIST logic path(s) may be deactivated by forcing all of the cones to a known state, which may be performed using a clock signal that may be a system clock signal. A plurality of MBIST patterns may be generated based on the deactivation of at least one particular non-MBIST logic path. A simulation may then be performed on the memory using the MBIST patterns.

In some exemplary embodiments of the present disclosure, the particular non-MBIST logic path(s) may be deactivated by disabling a plurality of clock tree branches, which may be disabled using clock gating logic inserted into the memory design. The particular non-MBIST logic path(s) may be deactivated by disabling a supernode(s) in the memory design.

An exemplary system, method, and computer-accessible medium for performing a simulation on a memory, may include, for example, receiving a design including a plurality of memory built-in self-test (MBIST) logic paths and a plurality of non-MBIST logic paths, identifying a plurality of cones in the non-MBIST logic paths, forcing the cones to a known state using a system clock signal, generating a plurality of MBIST patterns, and performing the simulation using the MBIST patterns.

An exemplary memory test arrangement may be provided, which may include, for example, a plurality of memory built-in self-test (MBIST) logic paths, a plurality of non-MBIST logic paths, and a clock providing a clock signal to the MBIST logic paths and the non-MBIST logic paths, where at least one of the non-MBIST logic paths is in a deactivated state based on the clock signal.

These and other objects, features, and advantages of the exemplary embodiments of the present disclosure will become apparent upon reading the following detailed description of the exemplary embodiments of the present disclosure when taken in conjunction with the appended claims.

BRIEF DESCRIPTION OF THE DRAWINGS

Further objects, features, and advantages of the present disclosure will become apparent from the following detailed description taken in conjunction with the accompanying Figures showing illustrative embodiments of the present disclosure, in which.

Figure 1:
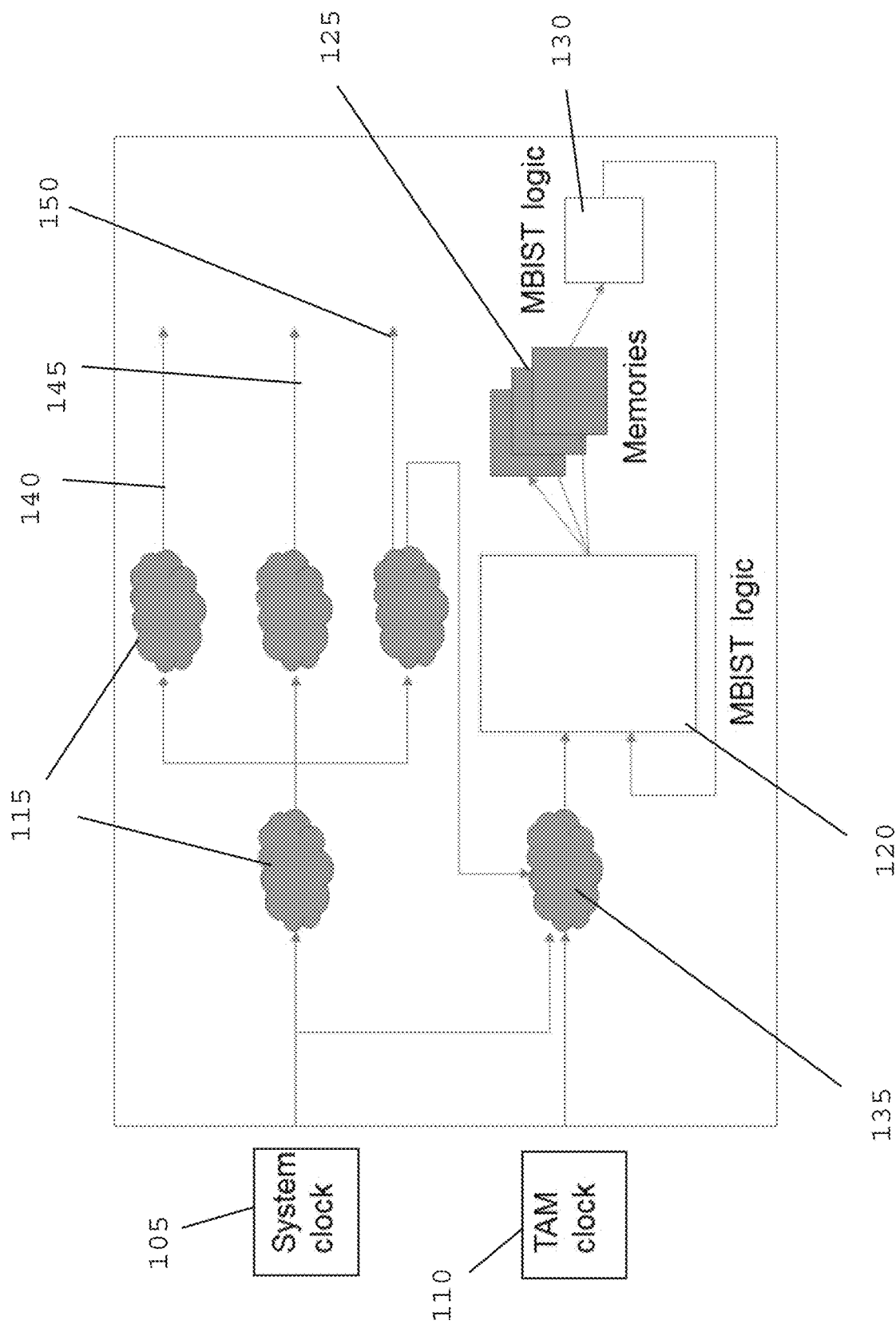
FIG. 1 is an exemplary schematic diagram of an MBIST test environment showing clock tree management according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DESCRIPTION OF EMBODIMENTS

Generally, the clock signal is the only signal that propagates through the entire design, even though only a part of the design may be tested. Thus, the propagation of the clock signal will cause certain events to occur, even though the events are not related to memory testing. This may add a significant amount of time to perform the simulations and is a huge drain on the power as each event running is unrelated to the testing being performed. If the clock signal may be prevented from propagating past the testing area, then a significant amount of time may be saved on the simulation (e.g., through increased throughput), while also reducing the power consumption. Additionally, a burn-in application (e.g., which includes repeatedly running tests for an extended period to force early life failures) may be run at the same time as the MBIST. However, it may be beneficial to isolate the MBIST from the burn-in application. In order to isolate MBIST logic, only non-MBIST logic, and particular areas of the memory or design not being tested, may be powered down (e.g., isolated), which may reduce the simulation time and power consumption.

In order to isolate the area being tested and power down non-tested areas all, or most of the flops, associated with the non-tested areas may be forced to a known state. With the flops being forced to a known state, the propagation of the clock signal will be prevented from causing events in these non-tested areas. The known state may be state agnostic (e.g., it does not matter what the state is) as long as the state is known. However, given the number of flops to be forced to a known state, this may be difficult to achieve as each flop may need to be individually addressed.

As an alternative to individually addressing each flop in order to force the flops to a known state, clock tree management may be performed, which may be used to isolate the non-tested areas. For example, clock gates may be added in the path that leads to the non-tested areas. These clock gates may fan out to multiple flops (e.g., flops in the non-tested areas). Thus, rather than individually addressing each flop, addressing a smaller number of clock control signals may be performed, which may propagate the signal to the flops in the non-tested areas. This may be used in conjunction with hierarchical boundaries in the design, which may be used to isolate particular areas in the design. While it may be possible to isolate non-tested areas in hardware and software, it may be beneficial to perform this analysis only using software using a clock tree analysis procedure or clock pruning procedure.

Using an exemplary clock tree analysis procedure, certain areas of a design (e.g., areas not being tested) may be isolated. For example, the clock route may be followed throughout the design (e.g., through most or all of the branches) in order to determine what logic belongs to the MBIST and/or memory being tested and what logic belongs to the areas not being tested (e.g., the area to isolate and shut down/disable). Two exemplary approaches may be used in order to perform the clock tree analysis or clock pruning procedure.

In order to disable logic, "force events" may be supplied to the simulation tool. These force events may include various force statements (e.g., force /Top/block1/pin4 0), which may tell the simulator not to perform any evaluations on that pin or on any downstream logic. When forcing values on flop inputs, it may be beneficial to force data and/or clock pin to a known value, depending on what the simulator uses to trigger an evaluation.

In the first exemplary approach, "force" events on each flop input not in the MBIST path may be used. This may include identifying MBIST logic versus non-MBIST logic. The force event may turn off most or all of the flops from being evaluated by the simulator. Thus, when a simulation of the memory is performed, because the non-MBIST flops have been deactivated, simulations will not be performed on the non-MBIST logic, which will significantly decrease the simulation time and power consumption.

In the second exemplary approach, "force" events on larger cones of logic not in MBIST path may be used. This may include identifying MBIST logic versus non-MBIST logic by identifying inputs to the largest cone of logic in the non-MBIST path to reduce the number of "force" events required. This approach may be more effective to implement because less "force" events are utilized in order to shut down/disable the non-MBIST logic.

In order to identify MBIST-specific logic, the exemplary system, method, and computer-accessible medium, according to an exemplary embodiment of the present disclosure, can identify a specific string used by exemplary memory design modules. For example, a "tem" prefix, which can be used on MBIST inserted logic, can be identified. This exemplary logic can be kept enabled, while non-MBIST logic, or certain non-MBIST logic, can be disabled. Using these blocks, the rest of the logic in the path that is beneficial to keep active can be identified using a forward trace and/or backward trace. All other logic (e.g., non-MBIST logic) can then be disabled.

Using such exemplary prior analysis mechanisms, it is possible to insert clock gating logic which can be controlled during MBIST operations to automatically disable these clock tree branches for the desired non-MBIST logic cones, thus supporting a reduction in power consumption as well as a reduction is simulation events.

While such an exemplary procedure can be utilized in software-driven event simulators, an embedded design clock control mechanism may be used in the actual hardware in order to reduce power. For example, clock gating circuits may be positioned at the source of the clock tree for the cones of logic in the non-MBIST logic paths to disable these during a memory built-in self-test. When such an approach is embedded into the design under test, it may be leveraged during the simulation of MBIST logic paths to also reduce simulation events.

FIG. 1 is an exemplary schematic diagram of an MBIST test environment showing clock tree management according to an exemplary embodiment of the present disclosure. For example, a System Clock 105 and a test access method ("TAM") clock 110 may be connected to non-MBIST logic (e.g., non-MBIST logic 115). Non-MBIST logic block 115 may include multiple paths of non-MBIST logic. Further non-MBIST logic 135 may be connected to MBIST logic block 120, which may include one or more memories 125. The further non-MBIST logic may also need to be shut down/disabled, although some non-MBIST logic may be included in the test simulation. One or more memories 125 may be connected to further MBIST logic 130. When a simulation is being performed, only the MBIST logic block 120, further MBIST logic 130, and the one or more memories 125 need to be operated. Thus, if non-MBIST logic blocks 115 and 135 are powered up, this may greatly increase the simulation time and power consumption. However, MBIST logic block 120 and further MBIST logic 130 may be isolated, which may reduce the simulation time and power may be reduced.

Figure 2:
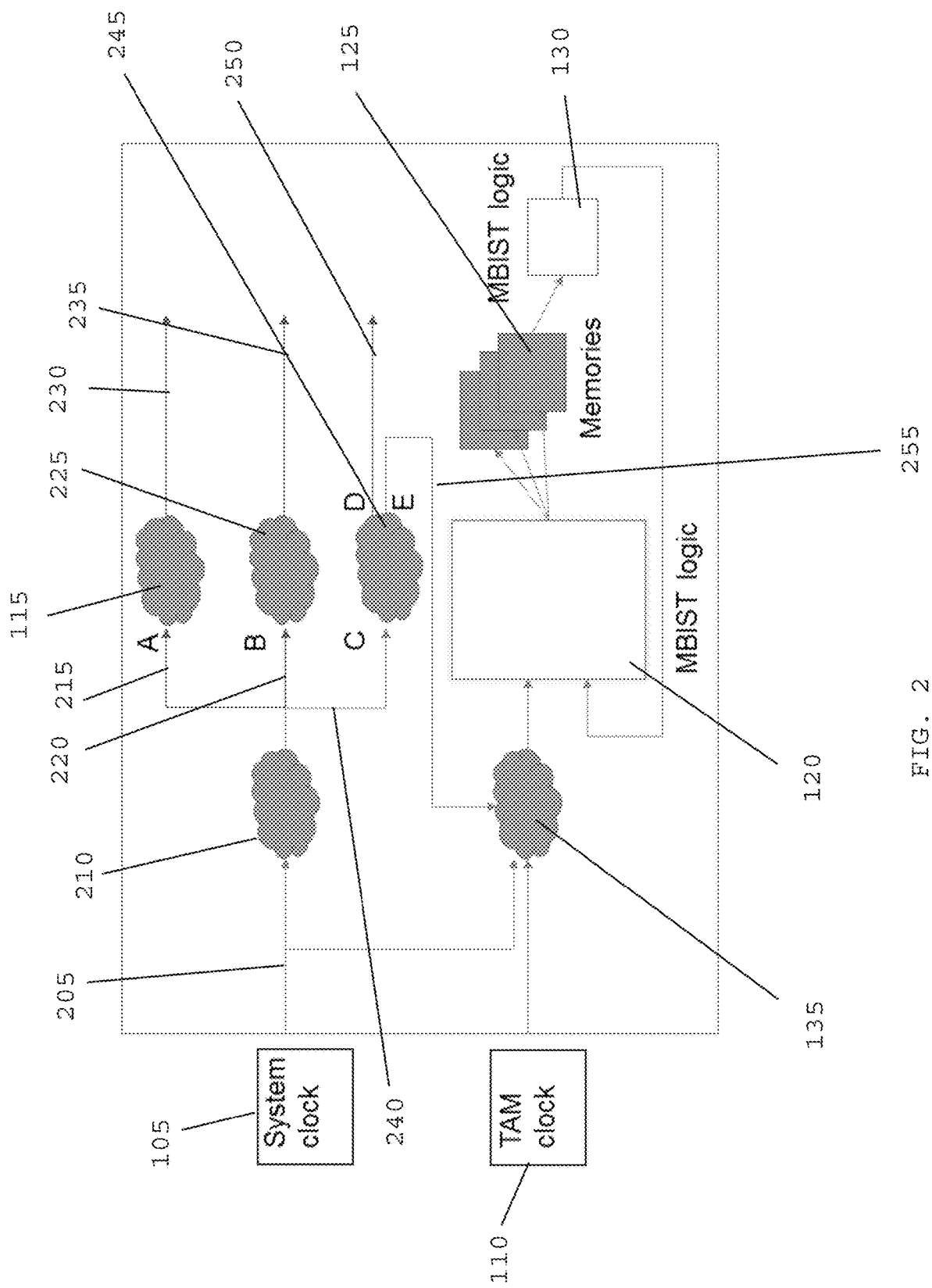
FIG. 2 is a further exemplary schematic diagram of an MBIST test environment showing clock tree management according to an exemplary embodiment of the present disclosure.

FIG. 2 is a further exemplary schematic diagram of an MBIST test environment showing clock tree management according to an exemplary embodiment of the present disclosure. For example, as shown in FIG. 2, certain paths in the logic may be shut down/disabled depending on the area being tested, while other paths may be active. In particular, path 205, may lead to non-MBIST logic blocks 135 and 210. Paths 215 and 220 may connect to non-MBIST logic blocks 115 and 225, which may be shut down/disabled, which may also shut down/disable paths 230 and 235 leading from non-MBIST logic blocks 115 and 225, respectively. Non-MBIST logic blocks 210 and 135 may be active, as these non-MBIST logic blocks may be tested during a simulation.

As also shown in FIG. 2, path 240 may also lead from non-MBIST logic block 210 to non-MBIST logic block 245, which may be active. However, path 250 leading from non-MBIST logic block 245 may be shut down/disabled, which will shut down/disable any further non-MBIST logic leading from non-MBIST logic block 245.

As also shown in FIG. 2, rather than directly shutting down/disabling all flip flops not being tested, it may be possible to shut down certain non-MBIST logic block nodes (e.g., cones), which may in turn shut down any non-MBIST logic leading from these nodes. For example, paths 215 and 220 may shut down/disable non-MBIST logic blocks 115 and 225, which may shut down all non-MBIST logic on paths 230 and 235. Non-MBIST logic block 245 may include a path 250 which may shut down/disable all non-MBIST connected downstream. However, non-MBIST logic block 245 may also be connected to non-MBIST logic block 135, which may in turn be connected to MBIST logic block 120. Thus, path 255 may remain active in order to not shut down/disable non-MBIST logic block 135.

In order to only disable path 250, and not disable path 255, only the clock pin feeding non-MBIST logic (e.g., path 250) needs to be disabled. If a path (e.g., path 250) feeds certain pins (e.g., /Top/block1/block2/pin1), and path 255 feeds other pins (e.g., /Top/block1/block3/pin1), then only /Top/block1/block2/pin1 would need to be forced to a known value.

The exemplary system, method, and computer-accessible medium, according to an exemplary embodiment of the present disclosure, can also identify certain nodes (e.g., supernodes) that may be used to disable a significant portion of the logic. Thus, the logic can be disabled by only a few supernodes, rather than separately disabling a significant number of nodes. For example, in order to identify and disable supernodes, paths to logic that are unnecessary (e.g., to be disabled) can be gathered or identified and the least common path can be determined. For example, if the following nodes were identified to be unnecessary: (i) /Top/block1/block2/pin1, (ii) /Top/block1/block2/pin2, and (iii) /Top/block1/block2/pin3, and these are all fed by /Top/block1/pin4, then only /Top/block1/pin4 would need to be forced off in order to disable the other nodes.

If multiple areas of a design are being tested, it may be beneficial to enable/disable different parts of the logic to be tested during the simulation (e.g., disable area 1, initiate simulation, during simulation disable area 1 and enable area 2). This may have an effect on the simulation time but not the overall power consumption. For example, in a multi-block flow, MBIST logic in certain blocks may be disabled but left active for other blocks. Since this is being performed only during simulation, it may have an effect on simulation time but would not affect power.

Figure 3:
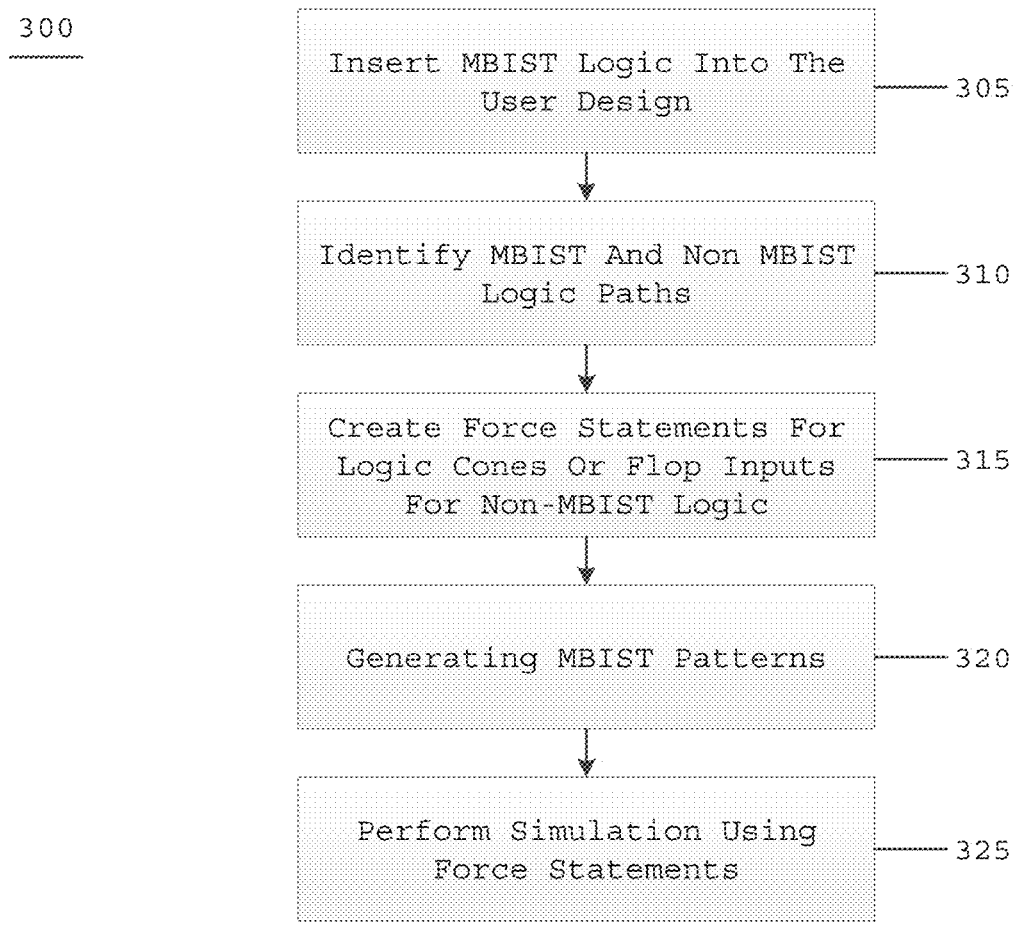
FIG. 3 is a flow diagram of an exemplary method for isolating certain logic paths in an MBIST test environment according to an exemplary embodiment of the present disclosure.

FIG. 3 is a flow diagram of an exemplary method 300 for isolating certain logic paths in an MBIST test environment according to an exemplary embodiment of the present disclosure. For example, at procedure 305, MBIST logic may be inserted into the design of a user. At procedure 310, MBIST and non-MBIST logic paths may be identified, which may be used to force statements to a known state for logic cones or flop inputs for the non-MBIST logic paths at procedure 315. At procedure 320, MBIST patterns may be generated. At procedure 325, a simulation may be performed using the force statements.

Figure 4A:
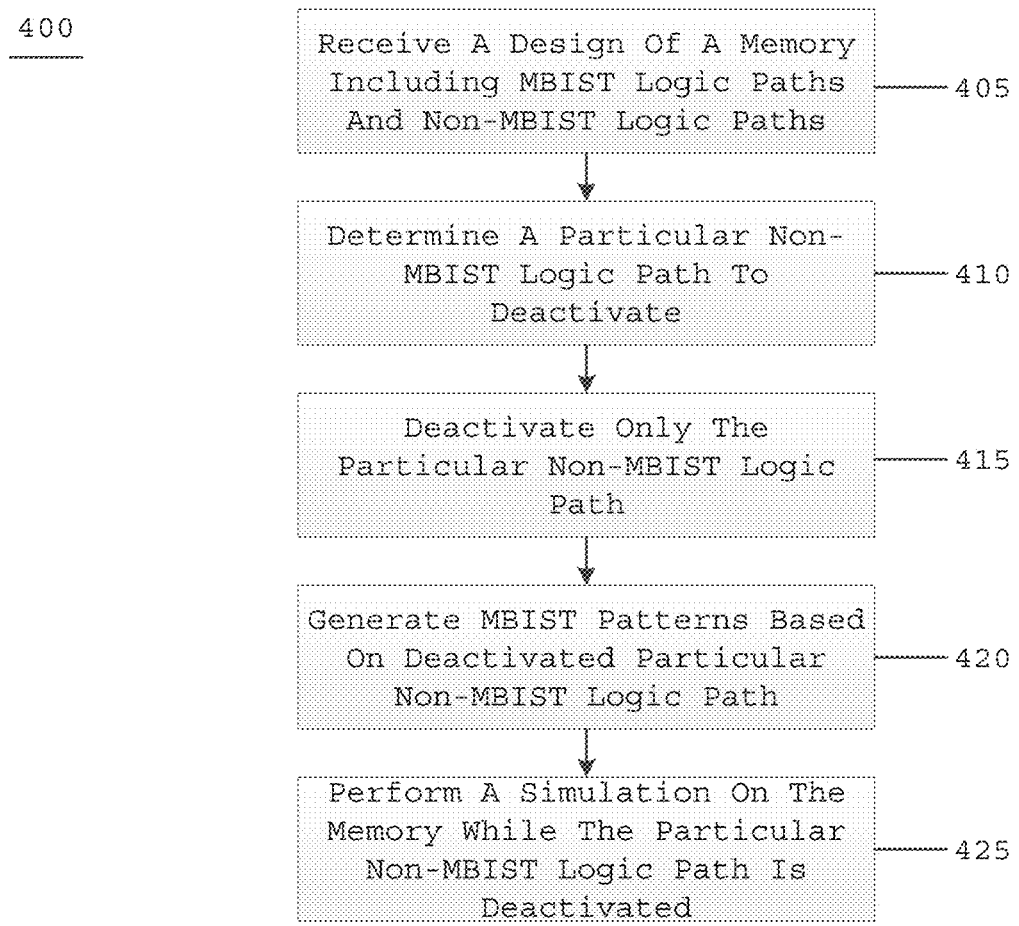
FIG. 4A is a flow diagram of an exemplary method according to an exemplary embodiment of the present disclosure.

FIG. 4A is a flow diagram of an exemplary method 400 according to an exemplary embodiment of the present disclosure. For example, at procedure 405, a design which includes MBIST logic paths and non-MBIST logic paths may be received. At procedure 410, a particular non-MBIST logic path to deactivate may be determined. At procedure 415, only the particular non-MBIST logic path may be deactivated. At procedure 420, MBIST test patterns may be generated based on the deactivated particular non-MBIST logic path. At procedure 425, a simulation of the memory may be performed while the particular non-MBIST logic path may be deactivated. At procedure 430, the particular non-MBIST logic path may be reactivated in a further simulation.

Figure 4B:
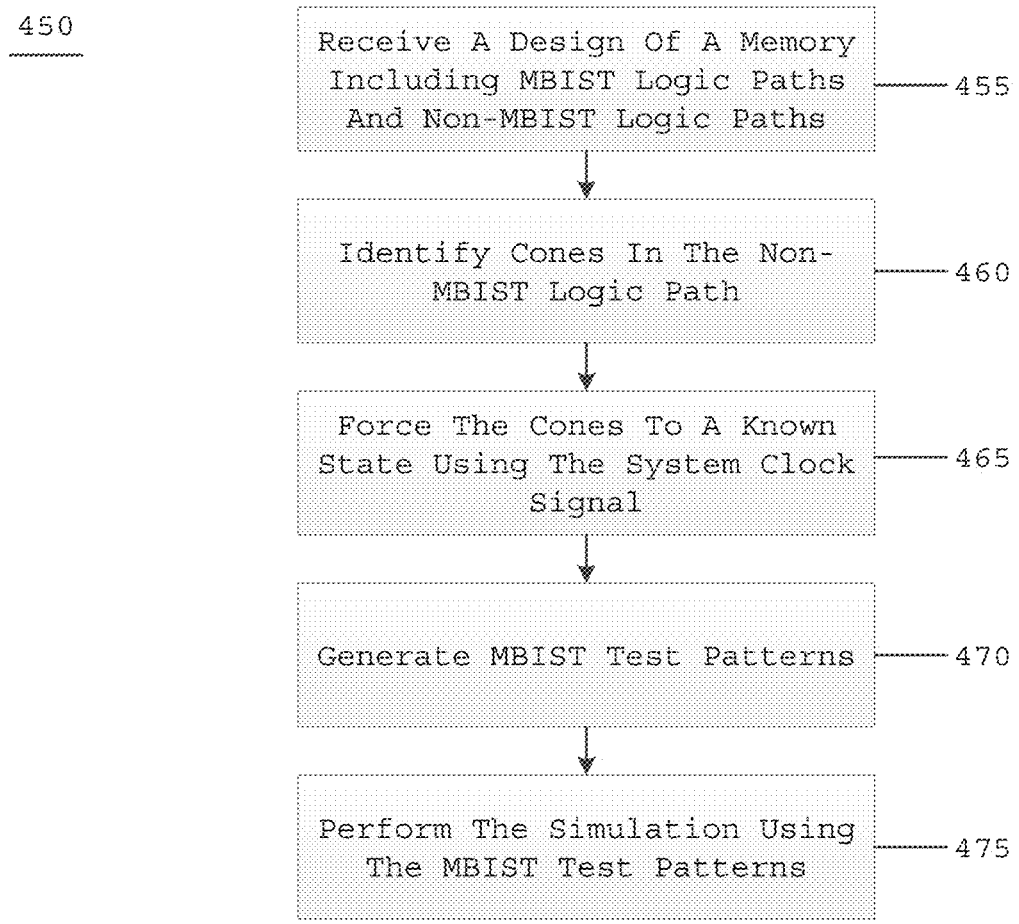
FIG. 4B is a flow diagram of an exemplary method for performing a simulation of a memory according to an exemplary embodiment of the present disclosure.

FIG. 4B is a flow diagram of an exemplary method 450 for performing a simulation of a memory according to an exemplary embodiment of the present disclosure. For example, at procedure 455, a design, which includes MBIST logic paths and non-MBIST logic paths, may be received. At procedure 460, cones in the non-MBIST logic paths may be identified, which may be forced to a known state using a system clock signal at procedure 465. At procedure 470, MBIST patterns may be generated. At procedure 475, simulations may be performed on the memory using the MBIST patterns.

Figure 5:
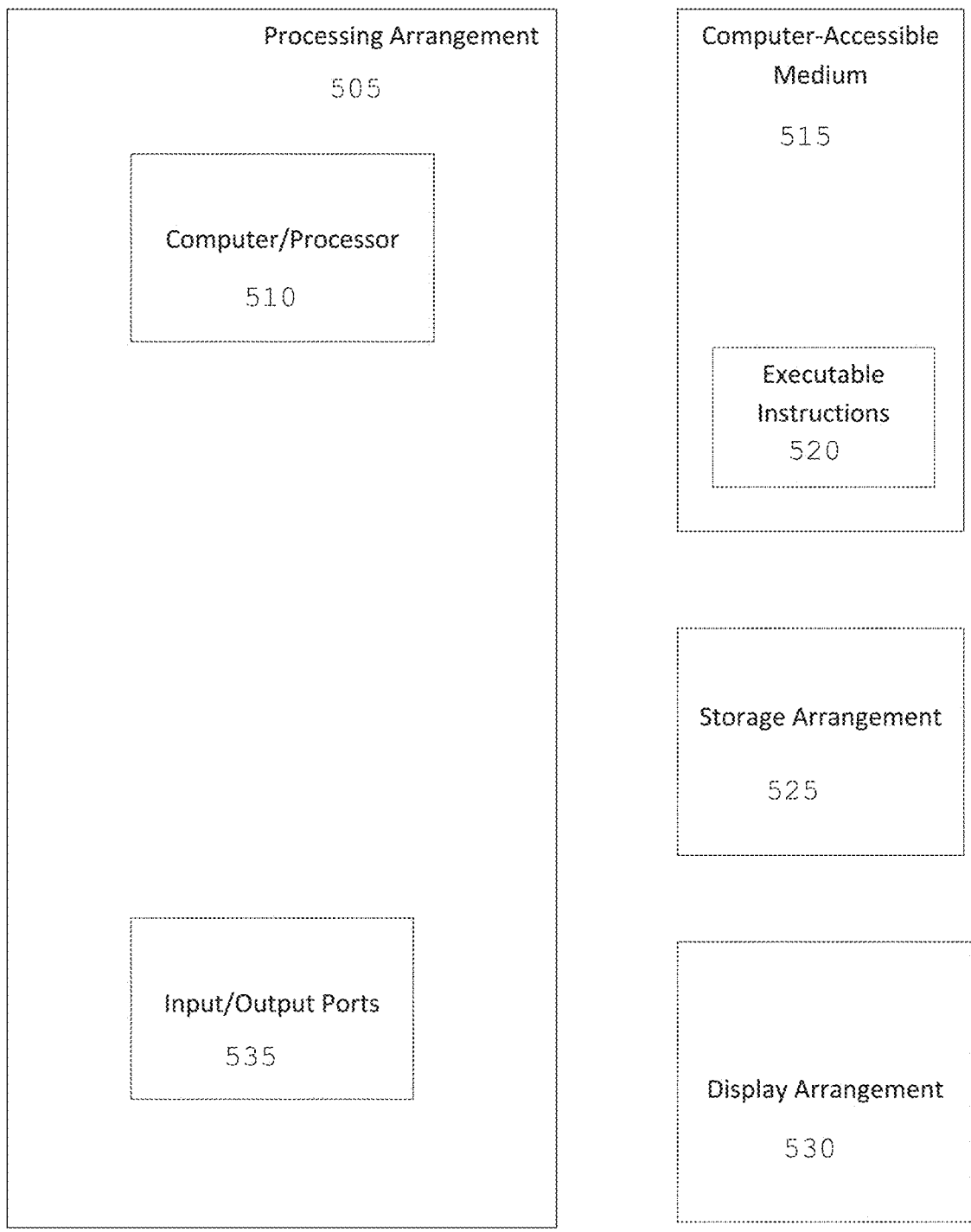
FIG. 5 is an illustration of an exemplary block diagram of an exemplary system in accordance with certain exemplary embodiments of the present disclosure.

FIG. 5 shows a block diagram of an exemplary embodiment of a system according to the present disclosure. For example, exemplary procedures in accordance with the present disclosure described herein may be performed by a processing arrangement and/or a computing arrangement 505. Such processing/computing arrangement 505 may be, for example entirely, or a part of, or include, but not limited to, a computer/processor 510 that may include, for example, one or more microprocessors and use instructions stored on a computer-accessible medium (e.g., RAM, ROM, hard drive, or other storage device).

As shown in FIG. 5, for example, a computer-accessible medium 515 (e.g., as described herein above, a storage device such as a hard disk, floppy disk, memory stick, CD-ROM, RAM, ROM, etc., or a collection thereof) may be provided (e.g., in communication with the processing arrangement 505). The computer-accessible medium 515 may contain executable instructions 520 thereon. In addition or alternatively, a storage arrangement 525 may be provided separately from the computer-accessible medium 515, which may provide the instructions to the processing arrangement 505 so as to configure the processing arrangement to execute certain exemplary procedures, processes, and methods, as described herein above, for example.

Further, the exemplary processing arrangement 505 may be provided with or include an input/output arrangement port 535, which may include, for example, a wired network, a wireless network, the internet, an intranet, a data collection probe, a sensor, etc. As shown in FIG. 5, the exemplary processing arrangement 505 may be in communication with an exemplary display arrangement 530, which, according to certain exemplary embodiments of the present disclosure, may be a touch-screen configured for inputting information to the processing arrangement in addition to outputting information from the processing arrangement, for example. Further, the exemplary display 530 and/or a storage arrangement 525 may be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and may be thus within the spirit and scope of the disclosure. Various different exemplary embodiments may be used together with one another, as well as interchangeably therewith, as should be understood by those having ordinary skill in the art. In addition, certain terms used in the present disclosure, including the specification, drawings and claims thereof, may be used synonymously in certain instances, including, but not limited to, for example, data and information. It should be understood that, while these words, and/or other words that may be synonymous to one another, may be used synonymously herein, that there may be instances when such words may be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method, comprising:
   receiving a design of a memory including a plurality of memory built-in self-test (MBIST) logic paths and a plurality of non-MBIST logic paths;
   determining at least one particular non-MBIST logic path of the non-MBIST logic paths to deactivate; and
   using a computer hardware arrangement, deactivating only the at least one particular non-MBIST logic path and activating at least one other non-MBIST logic path of the non-MBIST logic paths, wherein the deactivating comprises preventing a clock signal on a clock tree branch originating from a system clock signal from propagating to the at least one particular non-MBIST logic path of the plurality of non-MBIST logic paths to reduce power consumption.

2. The method of claim 1, further comprising performing a simulation on the memory while the at least on particular non-MBIST logic path is deactivated.

3. The method of claim 1, wherein the deactivating the at least one particular non-MBIST logic path includes forcing all flip flops in the at least one particular non-MBIST logic path to a known state.

4. The method of claim 3, wherein the flip flops are forced to the known state using a clock signal.

5. The method of claim 4, further comprising performing a simulation on the memory while the at least on particular non-MBIST logic path is deactivated.

6. The method of claim 1, wherein the deactivating of the at least one particular non-MBIST logic path includes forcing the at least one particular non-MBIST logic path to a known state.

7. The method of claim 6, wherein the at least one particular non-MBIST logic path is forced to the known state using at least one force statement.

8. The method of claim 1, wherein the determining the at least one particular non-MBIST logic path to deactivate includes identifying a plurality of cones in the non-MBIST logic paths.

9. The method of claim 8, further comprising deactivating the at least one particular non-MBIST logic path by forcing all of the cones to a known state.

10. The method of claim 9, wherein the cones are forced to the known state using the clock signal.

11. The method of claim 1, further comprising generating a plurality of MBIST patterns based on the deactivated at least one particular non-MBIST logic path.

12. The method of claim 1, wherein the at least one particular non-MBIST logic path is deactivated by disabling a plurality of clock tree branches that each originate from the system clock signal.

13. The method of claim 12, wherein the clock tree branches are disabled using clock gating logic inserted into the memory design.

14. The method of claim 1, wherein at least one particular non-MBIST logic path is deactivated by disabling at least one supernode in the memory design.

15. A method for performing a simulation on a memory, comprising:
   receiving a design of the memory including a plurality of a memory built-in self-test (MBIST) logic paths and a plurality of non-MBIST logic paths;
   identifying a first and second proper subset of cones in the plurality of non-MBIST logic paths;
   forcing the first proper subset of cones to a known state, wherein the forcing prevents a clock signal on a clock tree branch originating from a system clock signal from propagating to the first proper subset of cones in the plurality of non-MBIST logic paths, wherein the second proper subset of cones forced to an activated state to enable the system clock signal to propagate on the second proper subset of cones in the plurality of non-MBIST logic paths;
   generating a plurality of MBIST patterns; and
   using a computer hardware arrangement, performing the simulation using the MBIST patterns, wherein the forcing reduces a number of events occurring during the simulation.

16. The method of claim 15, further comprising performing the simulation on the memory while the non-MBIST logic paths are deactivated.

17. A design arrangement, comprising;
   a plurality of memory built-in self-test (MBIST) logic paths;
   a plurality of non-MBIST logic paths; and
   a system clock providing a clock signal on a clock tree branch to the MBIST logic paths and the non-MBIST logic paths;
   wherein at least one of the non-MBIST logic paths is in a deactivated state based on the clock signal and at least one other non-MBIST logic path is in an activated state, wherein the deactivating comprises preventing the clock signal from propagating to the at least one particular non-MBIST logic path of the plurality of non-MBIST logic paths to reduce power consumption.

18. The design arrangement of claim 17, wherein the clock signal originates from a system clock signal provided by the system clock.

19. The method of claim 1, wherein a clock gate is added in each non-MBIST logic path of the plurality of non-MBIST logic paths.

20. The method of claim 15, wherein a clock gate is added in each non-MBIST logic path in the plurality of non-MBIST logic paths, such that a first clock gate is turned off to force the first proper subset of cones to a known state and a second clock gate is turned on to force the second proper subset of cones to an activated state.

\* \* \* \* \*